US012217360B2

(12) United States Patent
Kawaguchi et al.

(10) Patent No.: US 12,217,360 B2
(45) Date of Patent: Feb. 4, 2025

(54) VIRTUAL SPACE CONNECTION DEVICE

(71) Applicant: TONARI KK, Tokyo (JP)

(72) Inventors: Ryo Kawaguchi, Tokyo (JP); Taj Campbell, Tokyo (JP); Allen Jacob Mcginty, Tokyo (JP); Brian Schwind, Tokyo (JP); Andrea Law, Tokyo (JP); Alvaro Arregui Falcon, Tokyo (JP); Alisaun Fukugaki, Tokyo (JP); Shiro Gonoo, Tokyo (JP)

(73) Assignee: Tonari KK, Tokyo (JP)

( * ) Notice: Subject to any disclaimer, the term of this patent is extended or adjusted under 35 U.S.C. 154(b) by 119 days.

(21) Appl. No.: 18/002,626

(22) PCT Filed: Mar. 22, 2021

(86) PCT No.: PCT/JP2021/011789
§ 371 (c)(1),
(2) Date: Dec. 20, 2022

(87) PCT Pub. No.: WO2022/009485
PCT Pub. Date: Jan. 13, 2022

(65) Prior Publication Data
US 2023/0290049 A1 Sep. 14, 2023

(30) Foreign Application Priority Data
Jul. 8, 2020 (JP) ................. 2020-117697

(51) Int. Cl.
G06T 17/00 (2006.01)
G06V 10/25 (2022.01)
(Continued)

(52) U.S. Cl.
CPC .............. G06T 17/00 (2013.01); G06V 10/25 (2022.01); G06V 10/60 (2022.01); H04N 5/74 (2013.01)

(58) Field of Classification Search
CPC ........ G06T 17/00; G06V 10/25; G06V 10/60; H04N 5/74; H04N 7/147; H04N 9/3182;
(Continued)

(56) References Cited

U.S. PATENT DOCUMENTS 10,798,347 B2 * 10/2020 Hisano ................... G03B 21/26
2004/0239755 A1 * 12/2004 Kjesbu ................... H04N 7/144
348/14.07

(Continued)

FOREIGN PATENT DOCUMENTS

JP 2002049367 A 2/2002
JP 2010114768 A * 5/2010
(Continued)

OTHER PUBLICATIONS

International Search Report dated Jun. 15, 2021 for PCT Application No. PCT/JP2021/011789.
(Continued)

Primary Examiner — Michael Le
(74) Attorney, Agent, or Firm — EIP US LLP

(57) ABSTRACT

A system receives, from a second space, a second picked-up image signal obtained by picking up by a second imaging unit, and projects in a first space an image on the basis of the second picked-up image signal. The system includes a region setting section that sets a specific output region, a signal processing section that generates post-processing image data by performing image signal processing on the second picked-up image signal in such a way that a luminance value of the image projected onto the specific output region becomes equal to or smaller than a specific value; and a device control section that causes projection of the image on the basis of the post-processing image data.

8 Claims, 10 Drawing Sheets

(51) Int. Cl.
*G06V 10/60* (2022.01)
*H04N 5/74* (2006.01)

(58) Field of Classification Search
CPC ...... H04N 9/3194; H04N 7/142; G06F 3/147; G09G 3/002; G09G 5/02
See application file for complete search history.

(56) References Cited

U.S. PATENT DOCUMENTS

| | | | | |
|---|---|---|---|---|
| 2014/0078170 A1* | 3/2014 | Ohki | .................... | G06T 11/001 345/606 |
| 2015/0237318 A1* | 8/2015 | Nakashin | ............ | H04N 23/633 348/745 |
| 2015/0348114 A1 | 12/2015 | Tanaka et al. | | |
| 2018/0101963 A1* | 4/2018 | Okawa | ...................... | G06T 7/60 |
| 2018/0364032 A1* | 12/2018 | Katsuki | ..................... | G06T 3/18 |
| 2019/0335146 A1* | 10/2019 | Hisano | ..................... | G06T 5/92 |

FOREIGN PATENT DOCUMENTS

| | | | |
|---|---|---|---|
| JP | 2015129796 A | 7/2015 | |
| JP | 2015228102 A | 12/2015 | |
| JP | 2019146118 A | 8/2019 | |
| WO | WO-03030530 A1 * | 4/2003 | ............... H04N 5/58 |

OTHER PUBLICATIONS

Written Opinion dated Jun. 15, 2021 for PCT Application No. PCT/JP2021/011789.
Extended European Search Report dated Nov. 23, 2023 for European Patent Application No. 21836766.2.

* cited by examiner

VIRTUAL SPACE CONNECTION DEVICE

CROSS-REFERENCE TO RELATED APPLICATIONS

This application is a 371 National Phase of International Application No. PCT/JP2021/011789, filed Mar. 22, 2021, which claims priority to Japanese Application No. JP 2020-117697, filed Jul. 8, 2020, under 35 U.S.C. § 119 (a). Each of the above-referenced patent applications is incorporated by reference in its entirety.

TECHNICAL FIELD

The present technology relates to a technology of a virtual space connection device that virtually connects spaces separated from each other.

BACKGROUND ART

Communication means such as a videophone is known which outputs an image captured in one space and sound collected in the one space to another space to thereby allow users present in the respective spaces to have a conversation with each other.

PTL 1 discloses a communication device that transmits an image of a user picked up by an imaging unit to a communication device of another user as a communication partner and that receives an image of the other user which image is transmitted from the communication device of the other user, to display the image on a display unit.

CITATION LIST

Patent Literature

PTL 1: Japanese Patent Laid-Open No. 2019-146118

SUMMARY OF INVENTION

Technical Problems

In the case of such communication means, it is desired that the users in the respective spaces not only simply have a conversation with each other but also communicate with each other with a sense of realism by sharing conditions of the mutual spaces. In addition, in order to enhance the senses of realism of the users present in the respective spaces, it is important to devise imaging in such a manner that conditions in one space can be projected onto the other space without a feeling of strangeness.

It is accordingly an object of the present invention to improve a sense of realism by displaying conditions of one space in another space without a feeling of strangeness in virtually connecting the spaces separated from each other, and consequently realize smooth communication between users present in the mutual spaces.

Solution to Problems

A virtual space connection device according to the present invention is used in a system that virtually connects a first space and a second space separated from the first space to each other by transmitting a first picked-up image signal obtained by image-pickup by a first imaging unit in the first space to the second-space side, projecting, by a second projector, an image based on the first picked-up image signal received from the first-space side onto a second projection target unit having a second camera hole for a second imaging unit to pick up an image of the second space at the second-space side, transmitting a second picked-up image signal obtained by image-pickup by the second imaging unit in the second space to the first-space side, and projecting, by a first projector, an image based on the second picked-up image signal received from the second-space side onto a first projection target unit having a first camera hole for the first imaging unit to pick up an image of the first space at the first-space side.

Thus, because, in each of the first space and the second space, an image of the other space is displayed and sound of the other space is output, the first space and the second space virtually are connected to each other.

Here, a specific output region refers to a region including the first camera hole in the first projection target unit.

The virtual space connection device according to the present invention described above includes a region setting section configured to set a specific output region including the first camera hole in the first projection target unit on the basis of a result of picking up an image of the first space by the first imaging unit, a signal processing section configured to generate post-processing image data by performing, on the second picked-up image signal, image signal processing in such a manner that a luminance value of an image projected onto the specific output region by the first projector becomes a specific value set in advance, and a device control section configured to make the first projector perform image projection based on the post-processing image data.

Thus, when image projection from the first projector is performed onto the first projection target unit, projected light entering the first imaging unit provided in the first camera hole from the first projector is reduced.

Here, the specific value is, for example, a luminance value at a level at which the user visually recognizing the first projection target unit can recognize the specific output region to be black.

It is to be noted that the specific value is not limited to a luminance value at a level at which the specific output region can be recognized to be black, and it is adequate that the specific value may be set as a luminance value at a level at which the projected light entering the first lens hole from the first projector does not cause lens flares in the image picked up by the first imaging unit.

In the above-described virtual space connection device according to the present invention, the region setting section may set the specific output region of the first projection target unit on the basis of a comparison between a calculated value based on a luminance of a picked-up image in the first picked-up image signal and a predetermined threshold value.

Thus, the specific output region is set with the brightness of the whole of the first space being taken into consideration.

The above-described virtual space connection device according to the present invention may include a condition determining section configured to determine conditions within the first space on the basis of a result of analysis processing on the first picked-up image signal, and the region setting section may set the specific output region according to the conditions within the first space determined by the condition determining section.

Thus, resetting processing of the specific output region is performed according to conditions within the first space.

In the above-described virtual space connection device according to the present invention, the condition determining section may determine whether or not there is a person within the first space on the basis of the result of analysis processing of the first picked-up image signal, and the region setting section may set the specific output region when it is determined that there is no person within the first space.

Thus, the setting of the specific output region is completed before a user enters the inside of the first space.

Advantageous Effects of Invention

According to the present invention, users present in spaces separated from each other can communicate with each other smoothly.

DESCRIPTION OF EMBODIMENT

Figure 1:
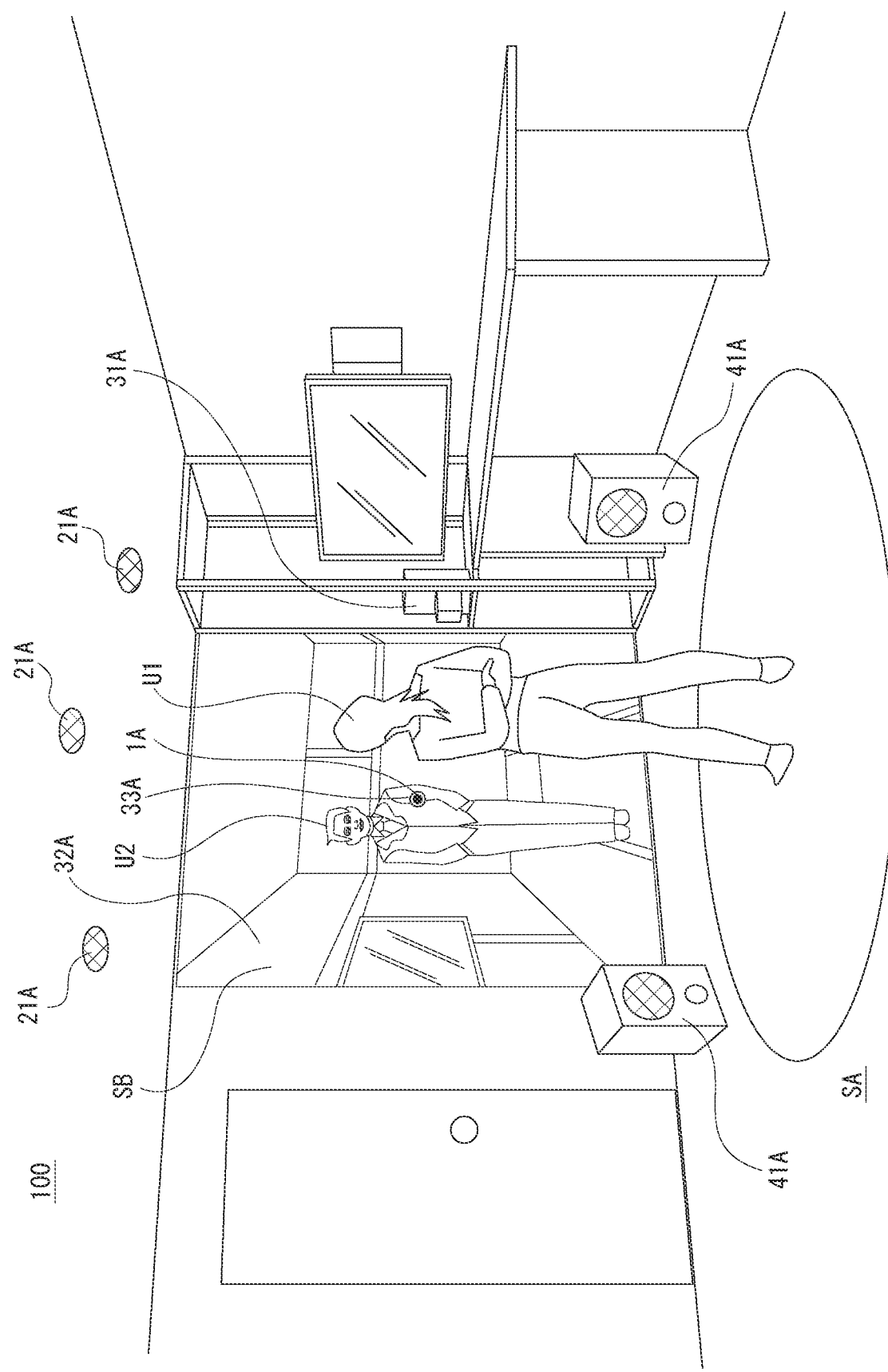
FIG. 1 is a diagram illustrating an outline of a virtual space connection device in an embodiment of the present invention.

In an embodiment of the present invention, as an example, a virtual space connection device 100 will be described which virtually connects a first space SA and a second space SB separated from the first space SA to each other by outputting, to an own space as the first space SA or the second space SB, a picked-up image and sound of the other space.

The first space SA and the second space SB in the present embodiment are, for example, indoor spaces and may represent various combinations such as a room in an own house and a room of a relative, a consulting room in a hospital and a room in the own house, an office of a company and a room in the own house, an office of an own company and an office of another company. Thus, the virtual space connection device 100 according to the present embodiment can virtually connect various spaces to each other.

In addition, in the following description, an image signal obtained by imaging at the first-space-SA side will be described as a first picked-up image signal, an audio signal obtained by collecting sound at the first-space-SA side will be described as a first audio signal, an image signal obtained by imaging at the second-space-SB side will be described as a second picked-up image signal, and an audio signal obtained by collecting sound at the second-space-SB side will be described as a second audio signal.

In addition, the first-space-SA side and the second space side have common configurations. Hence, a tail end of a reference sign for a configuration at the first-space-SA side is provided with "A" and a tail end of a configuration at the second-space-SB side is provided with "B" so as to distinguish the respective configurations from each other for convenience.

It is to be noted that respective configurations provided in the drawings to be referred to in the description represent only extracted configurations of principal parts related to the present invention, and that the configurations provided in the drawings can be changed in various manners according to design or the like without departing from the scope and spirit of the present invention.

In addition, a configuration described once in the following may subsequently be denoted by the same reference sign, and description thereof may be omitted. Further, the present invention is not limited to the present embodiment, and modifications, improvements, and the like within the scope where the object of the present invention can be achieved are included in the present invention.

The embodiment of the present invention will hereinafter be described in the following order.

(1. Outline of Virtual Space Connection Device)
(2. Configuration of Virtual Space Connection Device)
(3. Example of Processing of Embodiment)
(4 Summary)
(5. Modifications)

1. Outline of Virtual Space Connection Device

An outline of the virtual space connection device 100 according to the present embodiment will be described with reference to FIGS. 1 to 3. FIG. 1 illustrates an example of a state in which the second space SB virtually is connected as viewed from the first-space-SA side. In the following, description will be made of an example in which the first space SA and the second space SB are rooms in buildings different from each other.

Placed at the first-space-SA side are a first imaging unit 1A, three first microphones 21A, a first projector 31A, a first projection target unit 32A, two first speakers 41A, and a first arithmetic processing unit 5A not illustrated.

The first projection target unit 32A is, for example, a screen provided on a wall surface in the first space SA in such a manner as to spread from a floor surface to a ceiling. The first projection target unit 32A is provided with an infinitesimal first camera hole 33A in which the first imaging unit 1A for imaging the first space SA is placed. The first camera hole 33A is, for example, provided at a height around the neck of a user U1 in the first space SA (for example, at a height of approximately 145 cm from the floor surface) and in a central portion in a width direction of the first projection target unit 32A.

It is to be noted that the position at which the first camera hole 33A is provided is not limited to the above position, and the first camera hole 33A can be provided at any portion of the first projection target unit 32A as long as imaging of the first space SA by the first imaging unit 1A is not disrupted. In addition, in the drawings to be referred to in the description of the present embodiment, the first camera hole 33A is illustrated larger than actual dimensions for the convenience of description.

The first imaging unit 1A is, for example, a small digital camera whose imaging lens has a width of substantially 2 mm. The small digital camera is placed in such a manner that the imaging lens of the small digital camera is fitted into the first camera hole 33A.

By imaging the first space SA from the first-projection-target-unit-32A side by the first imaging unit 1A, it is possible to accomplish imaging as if the first space SA is viewed from the second-space-SB side. In addition, by providing the first imaging unit 1A at a height around the neck of the user U1, it is possible to image, substantially from the front, the user U1 in the first space SA, the user U1 intending to have a conversation with a user U2 in the second space SB. It is thus possible to perform imaging as if a line of sight of the user U1 in the first space SA is directed to the user U2 in the second space SB.

The first projector 31A is, for example, provided at a side of the first projection target unit 32A. Here, the first projector 31A is provided at a right side of the first projection target unit 32A as viewed from the user U1. In addition, the first projector 31A is provided at a height around a center in a height direction of the first projection target unit 32A.

Incidentally, in the following description, an upward direction, a downward direction, a leftward direction, and a rightward direction will be described with reference to a direction in which the first projection target unit 32A is viewed from the user U1 illustrated in FIG. 1.

Figure 2:
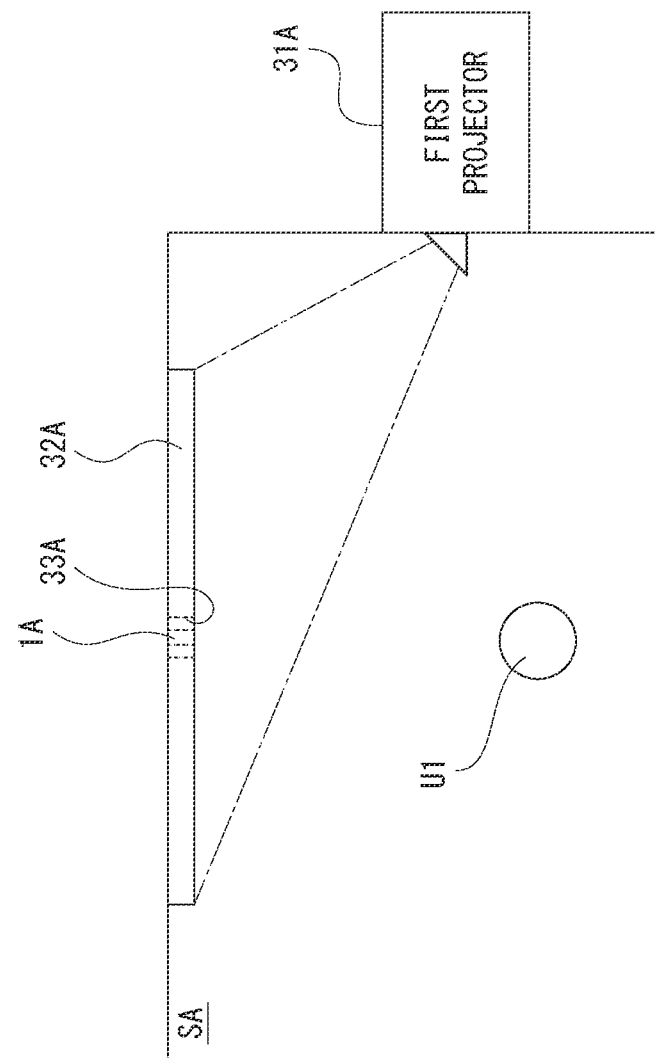
FIG. 2 is a diagram schematically illustrating a part of a plan view of a first space in the present embodiment.

FIG. 2 schematically illustrates a part of a plan view of the first space SA.

As illustrated in FIG. 2, the first projector 31A projects an image based on a second picked-up image signal at the second-space-SB side from the side of the first projection target unit 32A to the first projection target unit 32A. Consequently, a state of the second-space-SB side is displayed on the first projection target unit 32A at the first-space-SA side. Hence, the user U1 present in the first space SA can visually recognize conditions at the second-space-SB side in real time.

Incidentally, in FIG. 2, projected light from the first projector 31A is schematically indicated by alternate long and short dashed lines.

The first speakers 41A are arranged at the respective left and right sides of the first projection target unit 32A. In this case, the first speakers 41A are arranged at the left and right sides of the first projection target unit 32A in front as viewed from the user U1.

The first speakers 41A output sound based on a second audio signal at the second-space-SB side, so that a voice of the user U2 present in the second space SB, ambient sound in the second space SB, and the like are output to the first-space-SA side. Consequently, the user U1 present in the first space SA can aurally recognize conditions in the second space SB in real time.

The first projection target unit 32A and the first speakers 41A thus enable the user U1 present in the first space SA to recognize the conditions in the second space SB visually and aurally in real time. The user U1 can thus obtain a feeling as if the second space SB is present as an adjacent room.

Figure 3:
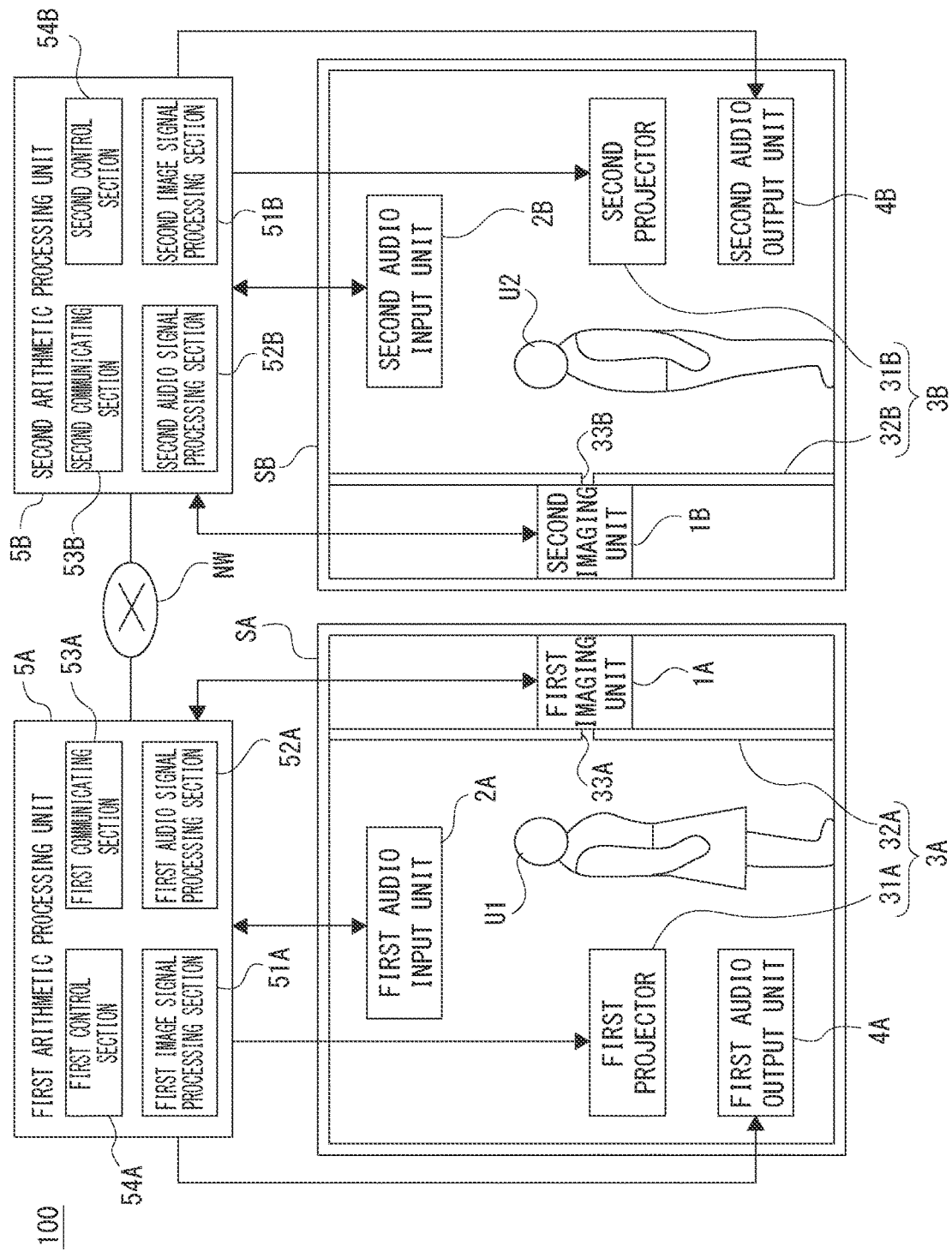
FIG. 3 is a diagram illustrating a configuration of the virtual space connection device in the present embodiment.

The first arithmetic processing unit 5A illustrated in FIG. 3 is implemented, for example, as a computer device such as a Personal Computer (PC). The first arithmetic processing unit 5A is connected to each of the first imaging unit 1A, the first microphones 21A, the first projector 31A, and the first speakers 41A in a wired or wireless manner.

The first picked-up image signal obtained by the image-pickup by the first imaging unit 1A is subjected to predetermined processing by the first arithmetic processing unit 5A and is then transmitted to a second arithmetic procedure unit 5B at the second-space-SB side.

Thereafter, a second projector 31B not illustrated in the second space SB performs image projection, based on the first picked-up image signal at the first-space-SA side, onto a second projection target unit 32B not illustrated. A picked-up image in the first space SA is thus displayed at a second-section-SB side. At this time, a real-size image at the first-space-SA side is displayed in order to emphasize a real-time communication and a sense of realism as if the communication partner is present very near.

Thus, the user U2 in the second space SB can also visually recognize conditions in the first space SA while being present in the second space SB.

In the first space SA, the three first microphones 21A are arranged on, for example, the ceiling of the first space SA in such a manner as to be separated from each other.

The first audio signal obtained by collecting sound by the first microphones 21A is subjected to predetermined processing by the first arithmetic processing unit 5A and is then transmitted to the second arithmetic procedure unit 5B at the second-space-SB side. A second speaker or speakers 41B which are not illustrated but arranged in the second space SB output sound based on the first audio signal in the first-space-SA side. Thus, the user U2 at the second-space-SB side can also aurally recognize conditions in the first space SA while being present in the second space SB.

As described above, the virtual space connection device 100 according to the embodiment of the present invention virtually connects the first space SA and the second space SB to each other at all times by mutually and continuously performing the processing of outputting the picked-up image signal and the audio signal input in one space to the other space.

Thus, the user U1 and the user U2 can obtain a feeling as if the mutual spaces are present as rooms adjacent to each other. In addition, the user U1 in the first space SA and the user U2 in the second space SB can recognize the mutual spaces and perform communication through conversations, movement, and the like without a feeling of strangeness.

Incidentally, the connection at all times in this case means a state in which mutual communication of picked-up images and audio signals is performed at all times irrespective of the presence or absence of users, and also means connection to a communication partner in a state in which a user can talk using sound and an image at any time.

2. Configuration of Virtual Space Connection Device

A configuration of the virtual space connection device 100 according to the embodiment of the present invention will be described with reference to FIGS. 1 to 6.

As illustrated in FIG. 3, the virtual space connection device 100 includes the first imaging unit 1A, a first audio input unit 2A, a first display unit 3A, a first audio output unit 4A, the first arithmetic processing unit 5A as well as a second imaging unit 1B, a second audio input unit 2B, a second display unit 3B, a second audio output unit 4B, and the second arithmetic processing unit 5B.

The first imaging unit 1A is provided in the first space SA. The first imaging unit 1A includes an imaging element configured as, e.g., a Charge Coupled Device (CCD) type or a Complementary Metal Oxide Semiconductor (CMOS) type. The first imaging unit 1A performs photoelectric conversion on light received by the imaging element, and outputs a result of the photoelectric conversion as the first picked-up image signal to the first arithmetic processing unit 5A.

The first audio input unit 2A is provided in the first space SA. The first audio input unit 2A includes a plurality of, for example, three, first microphones 21A (see FIG. 1). The first audio input unit 2A outputs the first audio signal, as an analog signal, representing sound collected by each of the first microphones 21A to the first arithmetic processing unit 5A.

The first display unit 3A is provided in the first space SA. The first display unit 3A includes, for example, the first projector 31A and the first projection target unit 32A.

The first projector 31A includes a projecting unit formed by an optical lens unit, a liquid crystal panel, a light source, and the like. Under control of a first control section MA, the first projector 31A performs image projection based on an image signal received from the first arithmetic processing unit 5A onto the first projection target unit 32A by the projecting unit. The image signal is an image signal based on the second picked-up image signal in the second space SB, the second picked-up image signal being received from the second arithmetic processing unit 5B.

The first projector 31A is implemented by various kinds of projectors, for example, a panel type projector that enlarges and projects an image displayed on an image forming element such as a Liquid Crystal On Silicon (LCOS) or a Digital Micro mirror Device (DMD), onto a screen by a projection optical system such as a semiconductor laser.

The first audio output unit 4A is, for example, the one or plurality of first speakers 41A. The first audio output unit 4A is provided in the first space SA (see FIG. 1). The first audio output unit 4A obtains the second audio signal obtained by collecting sound in the second space SB from the first arithmetic processing unit 5A that has received the second audio signal, and the first audio output unit 4A performs an audio output based on the received second audio signal.

The first arithmetic processing unit 5A includes functions of a first image signal processing section 51A, a first audio signal processing section 52A, a first communicating section 53A, and the first control section MA.

The first image signal processing section 51A is configured as an image processing processor by, for example, a Digital Signal Processor (DSP), a Video Display Processor (VDP), or the like. Under control of the first control section 54A, the first image signal processing section 51A performs various kinds of signal processing such as Analog/Digital (A/D) conversion processing on the first picked-up image signal as an analog signal from the first imaging unit 1A. In addition, the first image signal processing section 51A performs various kinds of signal processing such as luminance signal processing, color processing, resolution conversion processing, and codec processing on the first picked-up image signal as a digital signal.

The first audio signal processing section 52A is configured as an audio processing processor by, for example, a DSP. Under control of the first control section 54A, the first audio signal processing section 52A performs various kinds of signal processing such as Analog/Digital (A/D) conversion processing on the first audio signal as an analog signal from the first audio input unit 2A. In addition, the first audio signal processing section 52A performs various kinds of signal processing on the first audio signal as a digital signal. For example, the first audio signal processing section 52A performs beam forming processing, noise reduction processing, amplification processing, attenuation processing, sound quality processing, codec processing, and the like on the first audio signal. The term "the beam forming processing" is processing of controlling directivity in a sound collecting direction on the basis of different sound wave propagations from a sound source to the respective first microphones 21A.

The first communicating section 53A performs data communication by wireless communication via a network NW with the second arithmetic processing unit 5B in the second space SB under control of the first control section MA.

The first communicating section 53A transmits the first picked-up image signal obtained by picking up an image of the first space SA and the first audio signal obtained by collecting sound in the first space SA, to the second arithmetic processing unit 5B in the second space SB separated from the first space SA. In addition, the first communicating section 53A receives the second picked-up image signal obtained by picking up an image of the second space SB and the second audio signal obtained by collecting sound in the second space SB, from the second arithmetic processing unit 5B in the second space SB.

The first control section MA is configured as a microcomputer including, for example, a Graphics Processing Unit (GPU), a Central Processing Unit (CPU), a Read Only Memory (ROM), a Random Access Memory (RAM), and the like.

Figure 4:
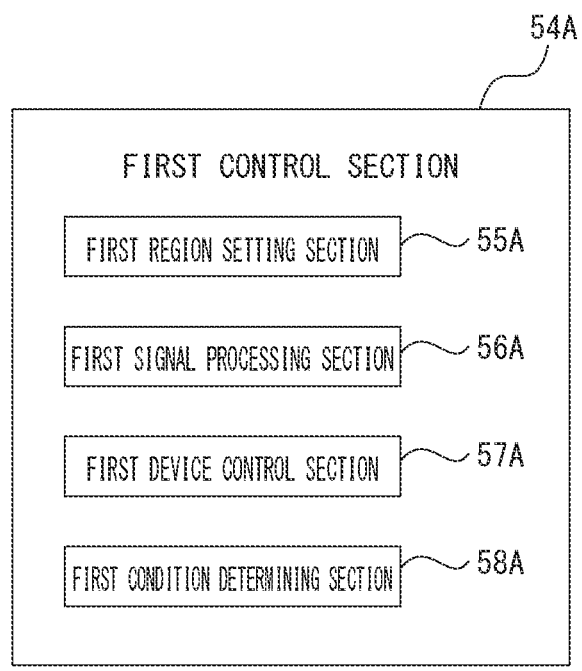
FIG. 4 is a diagram illustrating a functional configuration of the virtual space connection device in the present embodiment.

As illustrated in FIG. 4, the first control section MA includes a first region setting section 55A, a first signal processing section 56A, a first device control section 57A, and a first condition determining section 58A.

The first region setting section 55A sets a specific output region AR (part as indicated by hatching in FIG. 6 to be described later) including the first camera hole 33A in the first projection target unit 32A, on the basis of a result of imaging the first space SA by the first imaging unit 1A. The specific output region AR refers to a region including the first camera hole 33A in the first projection target unit 32A.

The first signal processing section 56A generates post-processing image data by performing image signal processing on the second picked-up image signal in such a manner that a luminance value of an image projected onto the specific output region AR by the first projector 31A becomes a specific value set in advance.

In the present embodiment, a luminance value at a level at which the user U1 visually recognizing the first projection target unit 32A can recognize the specific output region AR to be black, for example, is set as a predetermined value, and the specific value is set to be equal to or less than the predetermined value.

The first device control section 57A performs various kinds of control on the first imaging unit 1A, the first audio input unit 2A, the first projector 31A, the first audio output unit 4A, the first image signal processing section 51A, the first audio signal processing section 52A, and the first communicating section 53A in addition to the foregoing.

The first device control section 57A makes the first projector 31A perform image projection based on the post-processing image data generated by the first signal processing section 56A. Consequently, the first projector 31A projects the image of the second space SB onto the first projection target unit 32A, and projects, in black, the specific output region AR including the first camera hole 33A.

Hence, the projected light entering the first imaging unit 1A provided in the first camera hole 33A from the first projector 31A is suppressed (reduced).

Here, at the second-space-SB side, similar to the case of FIG. 2, the second projector 31B performs image projection from a side of the second projection target unit 32B to the second projection target unit 32B. Consequently, a state in the first space SA is displayed on the second projection target unit 32B.

At this time, because the second imaging unit 1B at the second-space-SB side is provided in a second camera hole 33B, projected light from the second projector 31B enters the second imaging unit 1B when the inside of the second space SB is imaged.

Figure 5:
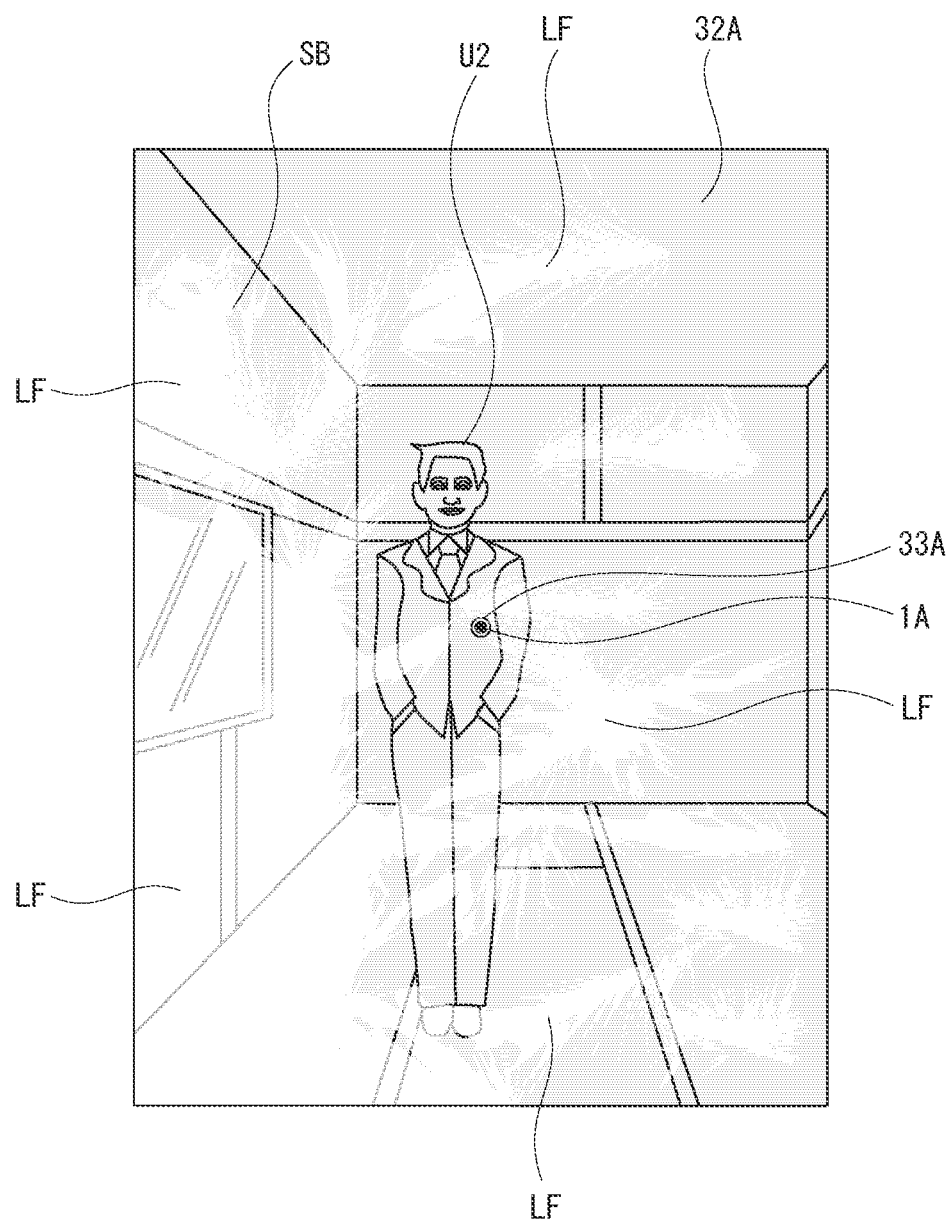
FIG. 5 is a diagram illustrating a second space projected onto a first projection target unit in a comparative example of the present embodiment.

As a result, due to an adverse effect of diffraction of a lens itself of the second imaging unit 1B, repetition of reflection of incident light, and the like, between combined lenses, between the lens and a lens barrel, between the lens and an imaging element, or on surface wiring of the imaging element, or the like, lens flares LF as illustrated in FIG. 5 (parts indicated in white in FIG. 5) occur when the picked-up image of the second space SB is projected on the first projection target unit 32A at the first-space-SA side. The same is true for a case in which a picked-up image of the first-space-SA side is projected on the second projection target unit 32B in the second space SB, though not illustrated.

The occurrence of such lens flares LF causes a feeling of strangeness when the user U1 in the first space SA and the user U2 in the second space SB recognize the states in the respective spaces. As a result, a sense of realism realized by the virtual space connection device 100 as if the spaces separated from each other are present as adjacent rooms is impaired.

Accordingly, in the present embodiment, the specific output region AR including the second camera hole 33B of the second projection target unit 32B is set at the second-space-SB side, and the second projector 31B is caused to perform image projection in such a manner that the specific output region AR is displayed in black.

Figure 6:
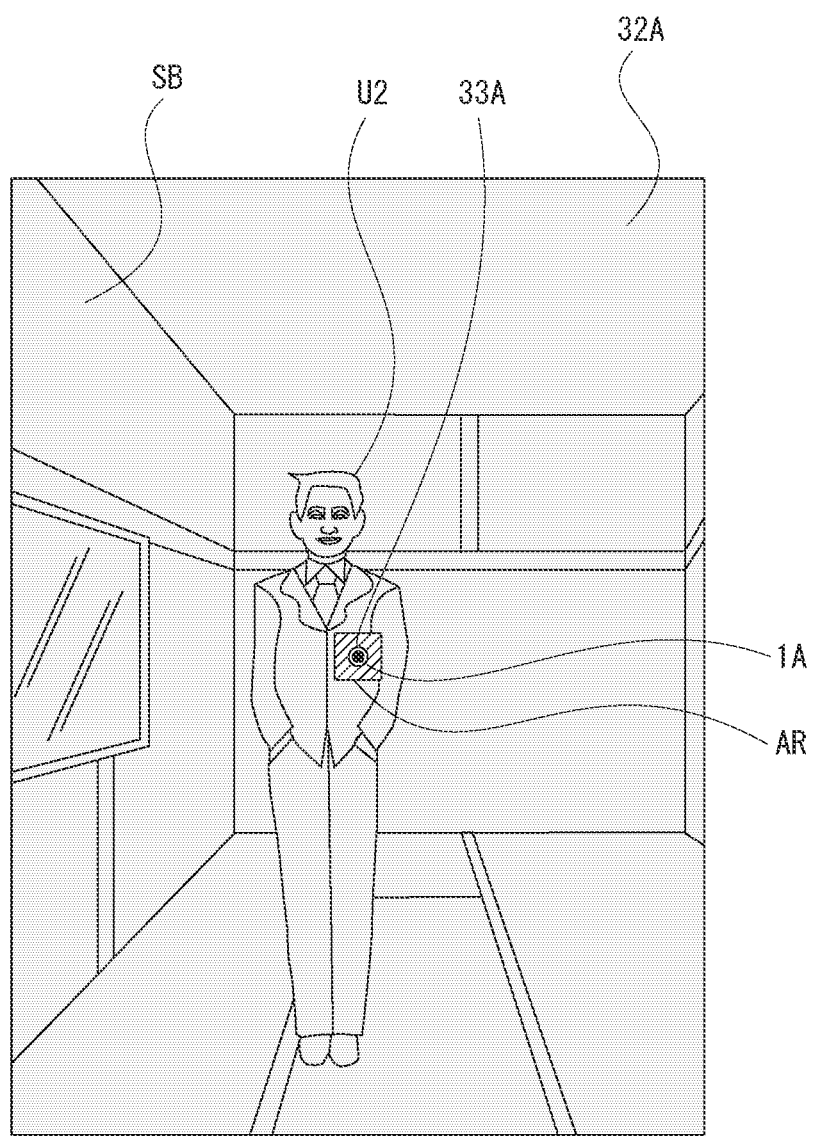
FIG. 6 is a diagram illustrating a second space projected onto a first projection target unit in the present embodiment.

Thus, as a result of suppressing (reducing) the projected light from the second projector 31B, such light entering the second imaging unit 1B provided in the second camera hole 33B, the occurrence of the lens flares LF is prevented in the image of the second space SB is illustrated in FIG. 6 and displayed on the first-space-SA side.

The same is true for the first-space-SA side. The specific output region AR including the first camera hole 33A is set at the first-space-SA side, and the first projector 31A is caused to perform image projection in such a manner that the specific output region AR is displayed in black. Thus, the occurrence of the lens flares LF is prevented in the image displaying the first space SA, the image being projected on the second-space-SB side.

In addition, the first condition determining section 58A performs image analysis processing on the first picked-up image signal received from the first imaging unit 1A. The first condition determining section 58A also performs audio analysis processing on the first audio signal received from the first audio input unit 2A.

The first condition determining section 58A determines conditions within the first space SA on the basis of a result of analysis processing of the first picked-up image signal and the first audio signal.

Here, the conditions within the space represent, for example, audio conditions within the space such as a voice of the user or silence, user conditions within the space such as the presence or absence, head count, position, gesture, and orientation of a user or users, brightness within the space, weather conditions, and the like.

Incidentally, in determining the conditions in the first space SA, analysis results of both the image analysis processing and the audio analysis processing may be used, or only either one of the analysis results may be used. In addition, in a case in which either one of the analysis results is used, the other analysis processing may not be performed.

Incidentally, each function of the first control section MA can be accomplished as software processing. Alternatively, each function of the first control section MA can be accomplished by hardware or a combination of software and hardware. For example, the processing of the first signal processing section 56A may be processing performed in the first image signal processing section 51A, the image analysis processing of the first condition determining section 58A can be processing performed by the first image signal processing section 51A, or the audio analysis processing of the first condition determining section 58A can be processing performed by the first audio signal processing section 52A.

Respective configurations of the second imaging unit 1B, the second audio input unit 2B, the second display unit 3B, the second audio output unit 4B, and the second arithmetic processing unit 5B are described by mutually replacing, in the description of the configurations on the above-described first-space-SA side, the first space SA and the second space SB, the first picked-up image signal and the second picked-up image signal, the first audio signal and the second audio signal, the first imaging unit 1A and the second imaging unit 1B, the first audio input unit 2A and the second audio input unit 2B, the first display unit 3A and the second display unit 3B, the first audio output unit 4A and the second audio output unit 4B, the first arithmetic processing unit 5A and the second arithmetic processing unit 5B, the first microphones 21A and second microphones 21B, the first projector 31A and the second projector 31B, the first projection target unit 32A and the second projection target unit 32B, the first camera hole 33A and the second camera hole 33B, the first speakers 41A and the second speakers 41B, the first image signal processing section MA and a second image signal processing section MB, the first audio signal processing section 52A and a second audio signal processing section 52B, the first communicating section 53A and a second communicating section 53B, and the first control section MA and a second control section MB.

In addition, each functional configuration of the second control section MB is described by mutually replacing the first region setting section 55A and a second region setting section 55B, the first signal processing section 56A and a second signal processing section 56B, the first device control section 57A and a second device control section 57B, and the first condition determining section 58A and a second condition determining section 58B.

Therefore, description of the configurations at the second-space-SB side will be omitted. In addition, when configurations and processing at the second-space-SB side, which are similar to those on the first-space-SA side, are omitted in the following description, and replacements will be made as described above.

The present embodiment is carried out on the basis of the above configurations.

3. Example of Processing of Embodiment

An example of processing performed by the first control section MA to carry out the present embodiment will be described with reference to FIG. 7. The first control section MA sets the specific output region AR as illustrated in FIG. 6 by performing processing illustrated in FIG. 7, for example.

Figure 8:
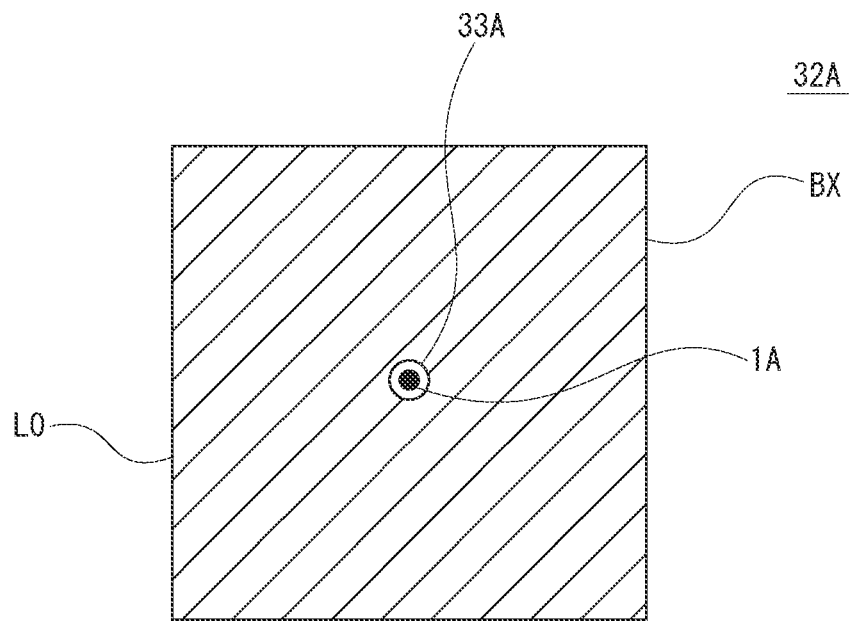
FIG. 8 is a first diagram illustrating an example of a projected image for setting a specific output region in the present embodiment.

First, the first control section MA in step S101 generates image data having such a luminance value that the user visually recognizing a search region BX illustrated in FIG. 8 recognizes the search region BX to be black (black projected part is indicated by hatching in FIG. 8; the same is true for subsequent figures), and makes the first projector 31A perform image projection output based on the generated image data.

Here, the search region BX is a region used to search for the position of the first camera hole 33A when the specific output region AR is set. The search region BX is set in advance by a user input or the like as a region including a range in which the first camera hole 33A is assumed to be positioned in the first projection target unit 32A.

Next, in step S102, the first control section 54A calculates a flare metric value BL of the picked-up image of the first space SA on the basis of the first picked-up image signal obtained by the image-pickup by the first imaging unit 1A in a state in which the search region BX is projected in black on the first projection target unit 32A.

The flare metric value BL is a value indicating an amount of light incident on the first imaging unit 1A, such amount being calculated on the basis of the first picked-up image signal obtained by the image-pickup by the first imaging unit 1A in a state in which the search region BX is projected in black.

The flare metric value BL is calculated as a value indicating an amount of light incident on the first imaging unit 1A in a case in which the state in which the search region BX including the first camera hole 33A is projected in black is assumed to be a state in which the least lens flares LF occur in the image picked up by the first imaging unit 1A.

The flare metric value BL is calculated by an algorithm of [Equation 1] below, for example. The value of "flare_metric (I)" calculated by [Equation 1] in the above-described state is set as the flare metric value BL.

$$\text{flare\_metric}(I) = \text{Sum}\_i(\text{brightness\_of\_pixel}\_i*(\text{distance\_from\_center}^E)) \qquad \text{[Equation 1]}$$

Here, an outline of [Equation 1] will be described.

In [Equation 1], "brightness_of_pixel_i" denotes the luminance of a pixel selected from the picked-up image (such a luminance will hereinafter be described also as a selected pixel luminance). In addition, "distance_from_center" denotes the distance of the selected pixel from the center of the picked-up image (such a distance will hereinafter be described also as a selected pixel distance). The luminance in this case is, for example, represented by vectors of three elements of red (R), blue (B), and green (G), a total value thereof, or the like.

In [Equation 1], a value obtained by performing weighting according to the distance from the center of the picked-up image is calculated for the selected pixel by multiplying the selected pixel luminance by a value obtained by raising the selected pixel distance to the power of a predetermined value E. Then, the flare metric value BL (flare_metric(I)) is calculated by a sum total (denoted by "Sum_i" in [Equation 1]) of values obtained by performing weighting, such values being calculated at respective pixels of the picked-up image.

Figure 9:
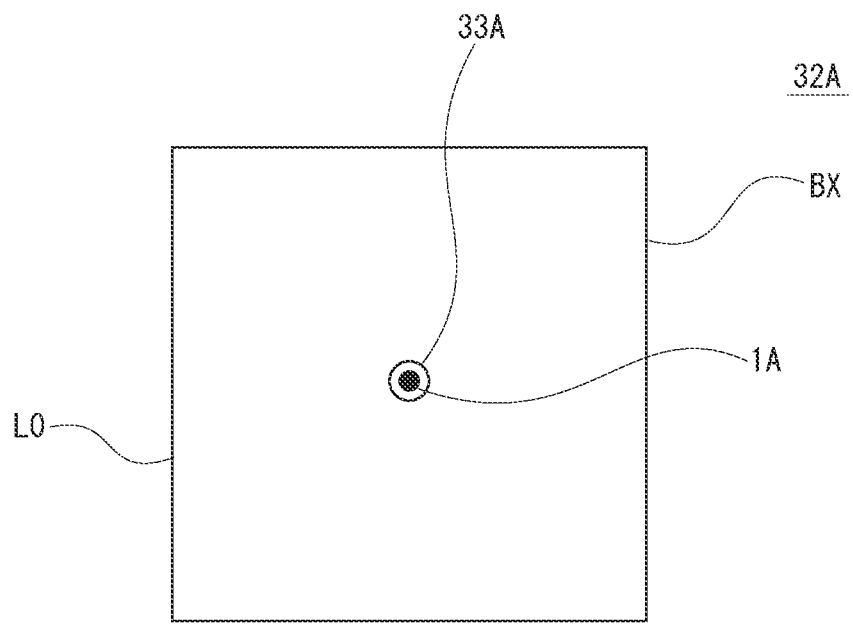
FIG. 9 is a second diagram illustrating an example of a projected image for setting the specific output region in the present embodiment.

Next, in step S103, the first control section MA generates image data having such a luminance value that the user visually recognizing the search region BX illustrated in FIG. 9 recognizes the search region BX to be white, and the first control section MA makes the first projector 31A perform image projection output based on the generated image data.

Next, in step S104, the first control section MA calculates a flare metric value WH of the picked-up image of the first space SA on the basis of the first picked-up image signal obtained by the image-pickup by the first imaging unit 1A in a state in which the search region BX is projected in white on the first projection target unit 32A.

The flare metric value WH is a value indicating an amount of light incident on the first imaging unit 1A, such amount being calculated on the basis of the first picked-up image signal obtained by the imaging by the first imaging unit 1A in a state in which the search region BX is projected in white.

The flare metric value WH is calculated as a value indicating an amount of light incident on the first imaging unit 1A in a case where the state in which the search region BX including the first camera hole 33A is projected in white is assumed to be a state in which the most lens flares LF occur in the image picked up by the first imaging unit 1A.

Incidentally, the flare metric value WH is calculated by the algorithm of [Equation 1] described above in the state in which the search region BX is projected in white.

Thereafter, the first control section 54A advances the processing to step S105 and calculates a threshold value th for determining the occurrence of a minute lens flare LF in the image picked up by the first imaging unit 1A on the basis of the calculated flare metric value BL and the calculated flare metric value WH.

Here, supposing that a coefficient by which the flare metric value BL is multiplied is "a," that a coefficient by which the flare metric value WH is multiplied is "b," and that a sum of the coefficients is "a+b=1," the value of the threshold value th is calculated by [Equation 2] below.

$$\text{Threshold Value } th = a \times (\text{Flare Metric Value BL}) + b \times (\text{Flare Metric Value WH}) \qquad \text{[Equation 2]}$$

The first control section MA determines whether or not a minute lens flare LF has occurred in the image picked up by the first imaging unit 1A on the basis of a comparison between a flare metric value PR, which is a calculated value based on the luminance calculated from the first picked-up image signal obtained by the first imaging unit 1A, and the threshold value th.

The first control section MA determines that a minute lens flare LF has occurred in the picked-up image when, for example, the calculated flare metric value PR becomes equal to or more than the threshold value th.

The first control section MA makes a setting in [Equation 2] described above in such a manner that, for example, the value of the coefficient by which the flare metric value BL is multiplied is larger than the value of the coefficient by which the flare metric value WH is multiplied, that is, in such a manner that "a>b." For example, the threshold value th is calculated by a sum of a value obtained by multiplying the flare metric value BL by "a=0.8" and a value obtained by multiplying the flare metric value WH by "b=0.2."

The sensitivity of detecting the occurrence of a minute lens flare can be enhanced by thus increasing a proportion of the flare metric value BL indicating a state in which the least lens flares LF occur in the picked-up image (state in which the inside of the first space SA is darkest) in the threshold value th.

When the setting processing of the threshold value th is thus performed on the basis of the result of imaging the first space SA, the threshold value th suitable for the space of the user U1 in which space the virtual space connection device 100 is used can be set flexibly. Hence, it is possible to improve the accuracy of determining the occurrence of a minute lens flare reflecting the conditions in the space in which the virtual space connection device 100 is used.

When the setting of the threshold value th is completed, the first control section MA performs processing of setting the specific output region AR on the basis of the threshold value th in processing from step S106 on down. The first control section MA sets the specific output region AR by identifying each end side of the specific output region AR from the search region BX.

The first control section MA in the step S106 selects an unset end side among an upper end side, a lower end side, a left end side, and a right end side of the search region BX. First, the first control section MA in the step S106 sets the left end side of the search region BX as an end side L0, as illustrated in FIG. 8, for example.

Next, the first control section MA in step S107 makes the first projector 31A perform image projection in such a manner that the search region BX of the first projection target unit 32A is displayed in black.

Figure 10:
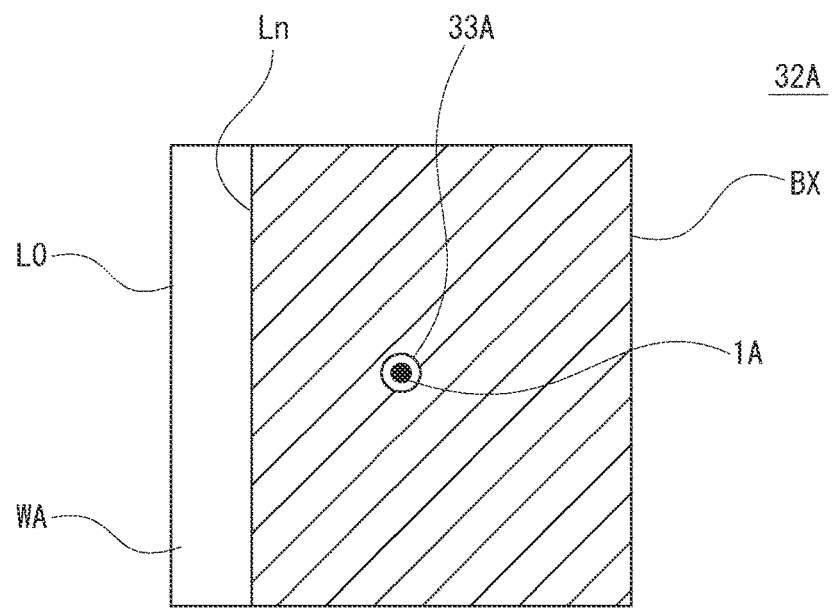
FIG. 10 is a third diagram illustrating an example of a projected image for setting the specific output region in the present embodiment.

Next, the first control section MA in step S108 sets a trial region WA as illustrated in FIG. 10.

The trial region WA is formed as a part of the search region BX. The trial region WA is a region on which image projection is performed in such a manner that the region is displayed in white in calculating the flare metric value PR to be described later, in the search region BX.

Supposing, for example, that a side parallel with the left end side L0 of the search region BX is an end side Ln, the first control section MA sets, as the trial region WA, a region enclosed by the left end side L0 and the end side Ln in the search region BX. Incidentally, "n" is a positive integer.

At this time, the end side Ln moves from the left end side L0 to the right end side of the search region BX in order of end sides L1, L2, L3, . . . each time the flare metric value PR is calculated. For example, letting "n=1," the first control section 54A sets, as the trial region WA, a region enclosed by the left end side L0 and the end side L1 in the search region BX.

The first control section 54A makes the first projector 31A perform image projection in such a manner that the trial region WA is displayed in white.

At this time, the first control section 54A advances the processing to step S109 and calculates the flare metric value PR on the basis of the first picked-up image signal obtained by the image-pickup by the first imaging unit 1A in a state in which the trial region WA is projected in white. As with the flare metric value BL and the flare metric value WH described above, the flare metric value PR is calculated by [Equation 1] described above.

The first control section 54A in step S110 determines whether or not the flare metric value PR is equal to or more than the threshold value th.

When the flare metric value PR is not equal to or more than the threshold value th, the first control section 54A determines that no minute lens flare LF has occurred in the image picked up by the first imaging unit 1A. Therefore, the first control section 54A advances the processing to step S111 without setting the end side Ln as an end side of the specific output region AR.

The first control section MA in the step S111 moves the end side Ln in a rightward direction. That is, the first control section MA sets the end side L(n+1) moved in the rightward direction as a new end side Ln. Here, moving the end side Ln to the end side L(n+1) means moving the end side Ln by, for example, one pixel. Incidentally, an amount of movement in this case is not limited to one pixel. The movement may be made at intervals of a plurality of pixels, or the amount of movement may differ for each movement.

The first control section MA thereafter advances the processing from the step S111 to the step S107. The first control section MA repeatedly performs the processing of the steps S107 to S111 until the flare metric value PR becomes equal to or more than the threshold value th in the step S110.

Thus, a ratio of the trial region WA to the search region BX gradually increases in the rightward direction.

Conversely, when the first control section MA determines in the step S110 that the flare metric value PR is equal to or more than the threshold value th, the first control section MA determines that a minute lens flare LF has occurred in the image picked up by the first imaging unit 1A.

Figure 11:
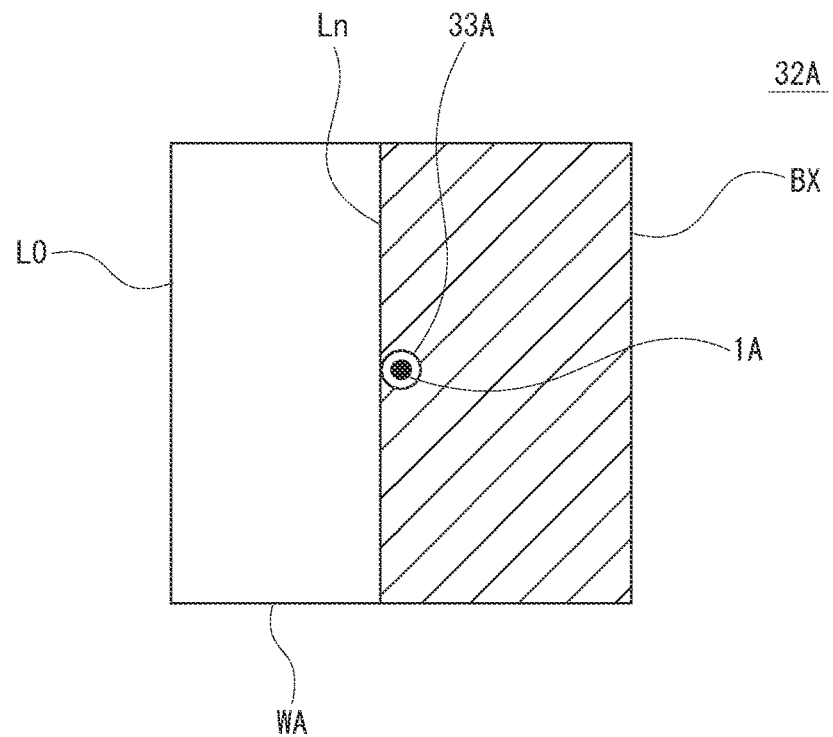
FIG. 11 is a fourth diagram illustrating an example of a projected image for setting the specific output region in the present embodiment.

This is due to a fact that, as illustrated in FIG. 11, for example, the projected light entering the first camera hole 33A gradually increases as a result of the trial region WA that is projected in white approaching a left end portion of the first camera hole 33A.

At this time, the first control section MA advances the processing to step S112 and sets, as a left end side of the specific output region AR, the end side Ln as illustrated in FIG. 11 obtained when the occurrence of the minute lens flare LF is detected.

Then, after setting the left end side of the specific output region AR, the first control section MA returns the processing to the step S106 until all end sides such as a right end side, an upper end side, and a lower end side of the specific output region AR are set in step S113. The first control section MA thereafter repeats the processing of the steps S106 to S112.

Figure 12:
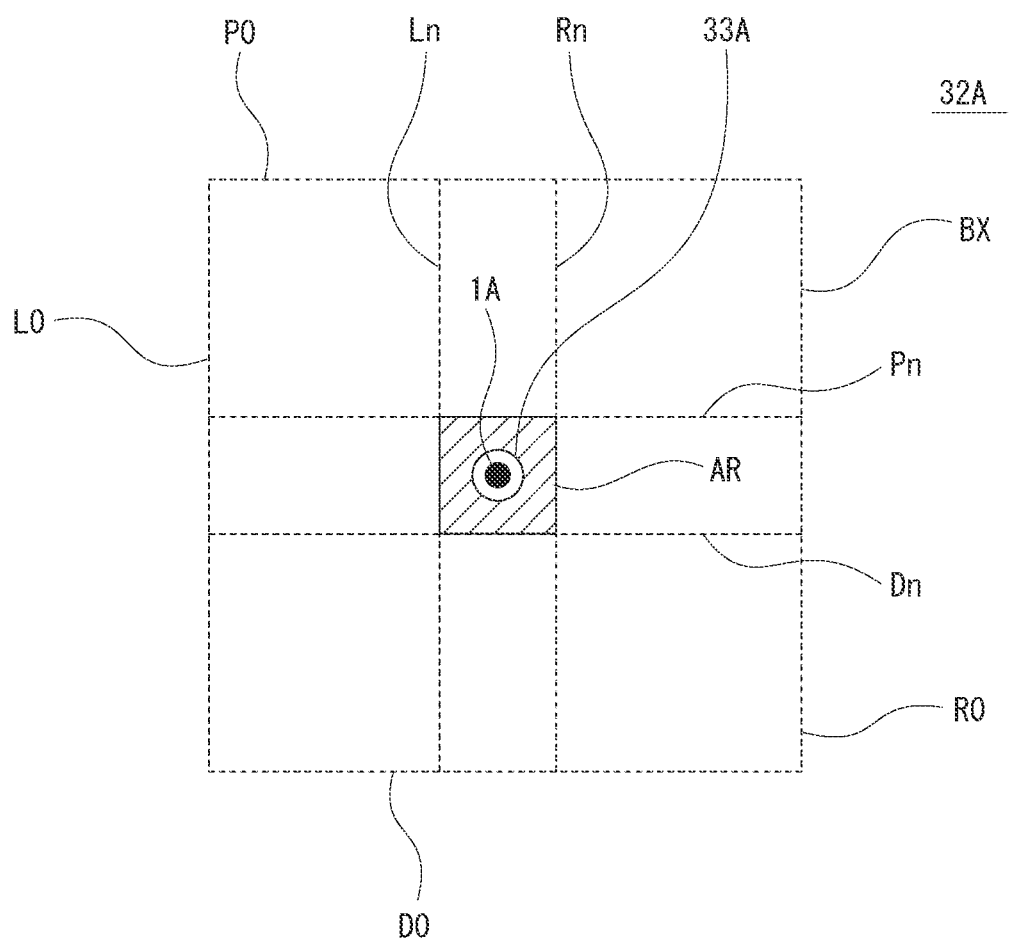
FIG. 12 is a fifth diagram illustrating an example of a projected image for setting the specific output region in the present embodiment.

For example, the first control section MA advances the processing from the step S113 to S106 and selects an unset right end side R0 of the search region BX (see FIG. 12).

In addition, in the processing of the steps S106 to S112, the first control section MA gradually increases the trial region WA enclosed by the right end side R0 and a parallel end side Rn on the left side of the right end side R0 until the flare metric value PR becomes equal to or more than the threshold value th. Here, when the flare metric value PR becomes equal to or more than the threshold value th, the first control section MA sets the end side Rn as the right end side of the specific output region AR.

Then, the first control section MA advances the processing to the step S113.

In addition, the first control section MA advances the processing from the step S113 to S106 again and selects an unset upper end side P0 of the search region BX.

In the processing of the steps S106 to S112, the first control section MA gradually increases the trial region WA enclosed by the upper end side P0 and a parallel end side Pn on the lower side of the upper end side P0 until the flare metric value PR becomes equal to or more than the threshold value th. Here, when the flare metric value PR becomes equal to or more than the threshold value th, the first control section MA sets the end side Pn as the upper end side of the specific output region AR.

Then, the first control section MA advances the processing to the step S113.

Finally, the first control section MA advances the processing from the step S113 to S106 and selects an unset lower end side D0 of the search region BX.

In the processing of the steps S106 to S112, the first control section MA gradually increases the trial region WA enclosed by the lower end side D0 and a parallel end side Dn on the upper side of the lower end side DO until the flare metric value PR becomes equal to or more than the threshold value th. Here, when the flare metric value PR becomes equal to or more than the threshold value th, the first control section MA sets the end side Dn as the lower end side of the specific output region AR.

Then, the first control section MA advances the processing to the step S113.

As described above, the first control section 54A sets each end side of the specific output region AR by using a so-called linear search.

Figure 7:
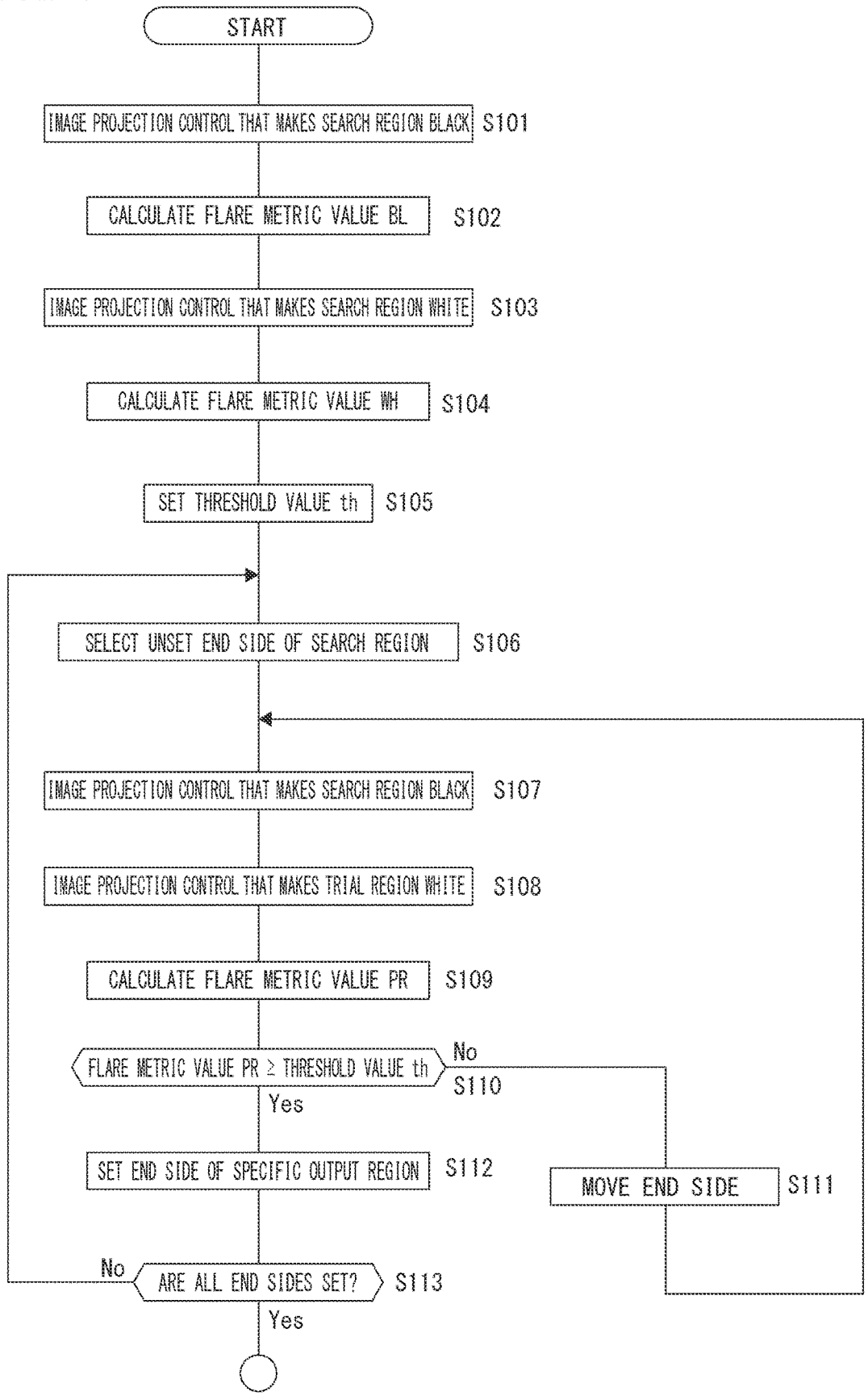
FIG. 7 is a flowchart illustrating processing of a first control section in the present embodiment.

The first control section 54A ends the processing illustrated in FIG. 7 when the first control section 54A identifies the position of the specific output region AR in the search region BX as illustrated in FIG. 12 by setting all of the end sides of the specific output region AR in the step S113.

The first control section 54A performs the processing illustrated in FIG. 7 at the time of, for example, starting the first arithmetic processing unit 5A in the virtual space connection device 100 or in response to an operating input of the user or the like. Other execution timings of the processing will be described later.

Incidentally, while a linear search is used as a scheme of setting each end side of the specific output region AR in the present embodiment, another scheme, for example, a scheme of a binary search can be used.

In addition, as an example in this case, the end sides of the specific output region AR are set in order of the left end side, the right end side, the upper end side, and the lower end side. However, the order of the setting is not limited to this, and the end sides can be set in any order.

In a state in which the specific output region AR is set by the processing of FIG. 7, the first control section MA generates post-processing image data by performing image signal processing on the second picked-up image signal in such a manner that the luminance value of the image projected onto the specific output region AR by the first projector 31A becomes a specific value set in advance.

Then, the first control section MA makes the first projector 31A perform projection output to the specific output region AR on the basis of the post-processing image data.

Consequently, a picked-up image at the second-space-SB side in which the specific output region AR is projected in black is displayed on the first projection target unit 32A at the first-space-SA side. By projecting the specific output region AR in black, it is possible to reduce the projected light entering the first camera hole 33A from the first projector 31A and suppress (reduce) the occurrence of lens flares LF in the image picked up by the first imaging unit 1A.

It is to be noted that the specific value in the present embodiment is not limited to a luminance value at a level at which the user can recognize the specific output region SA to be black, and it suffices to set the specific value as a luminance value at a level at which the projected light entering the first camera hole 33A from the first projector 31A does not cause lens flares in the image picked up by the first imaging unit 1A. Hence, the specific value may be a luminance value at a level at which the user can recognize the specific output region SA to be blue or green, for example.

Incidentally, the position of the first projector 31A provided within the first space SA may be displaced due to vibration of the device itself, an external factor such as an earthquake, and the like. Then, a displacement occurs between the position of the currently set specific output region AR and the actual position of the first camera hole 33A.

In such a case, in order to keep suppressing (reducing) the occurrence of lens flares LF due to the projected light entering the first camera hole 33A from the first projector 31A, it is necessary to reset the specific output region AR on the basis of positional relation between the first projector 31A after the positional displacement and the first camera hole 33A.

Accordingly, the first control section MA performs the processing of FIG. 7 according to various kinds of conditions and resets the specific output region AR as appropriate.

For example, the first control section MA can reset the specific output region AR periodically, for example, every time a predetermined time such as "50 minutes" or "3 hours" has passed or at a predetermined time period such as "11 p.m." or "4 a.m."

In addition, when such setting processing of the specific output region AR is performed, black-and-white rectangular projections in the search region BX, for example, appear during the projection of the image of the second-space-SB side onto the first projection target unit 32A, so that a feeling of strangeness may be caused to the user U1 in the first space SA who views the projected image of the second space SB.

Accordingly, the first control section 54A performs the processing of FIG. 7 and sets the specific output region AR in a midnight time period in which there is a high possibility of the user U1 in the first space SA not communicating with the user U2 in the second space SB, for example. The setting processing of the specific output region AR can be performed without causing a feeling of strangeness to the user U1 by thus performing the processing of FIG. 7 in a time period in which the user U1 is assumed not to use the virtual space connection device 100.

In addition, the first control section MA determines the conditions within the first space SA on the basis of a result of analysis processing on the first picked-up image signal and the first audio signal or the like. Then, the first control section MA performs the setting processing of the specific output region AR according to the conditions within the first space SA.

For example, the first control section MA determines, from the result of analysis processing on the first picked-up image signal and the first audio signal, whether or not a person is present within the first space SA as the conditions within the first space SA. Then, the first control section MA sets the specific output region AR when the first control section MA determines that there is no user U1 within the first space SA.

Consequently, the setting of the specific output region AR is completed before the user U1 enters the inside of the first space SA. The setting processing of the specific output region AR can therefore be performed without causing the user U1 to feel strangeness.

The first control section MA performs image analysis processing based on the first picked-up image signal from the first imaging unit 1A, in each frame unit. The first control section MA detects the user U1 within the first space SA by the image analysis processing based on the first picked-up image signal.

The image analysis processing may extract an image of the user U1 by a scheme of pattern matching, or may, for example, detect a moving body by a scheme of moving body detection based on a frame difference and detect the user U1 from the moving body.

In addition, the first control section MA performs audio analysis processing based on the first audio signal received from the first audio input unit 2A. The first control section MA obtains audio classification information on a talking voice of the user U1, ambient sound within the first space SA, and the like by performing the audio analysis processing, and detects the user U1 according to the presence or absence of the talking voice of the user U1.

In addition, the first control section 54A can also perform the processing of FIG. 7 in a period of one frame in 60 fps in the image projection onto the first space SA. Consequently, it becomes difficult for the user U1 to recognize black-and-white rectangles in the search region BX projected on the first projection target unit 32A in the processing of FIG. 7. Hence, this also enables the setting processing of the specific output region AR to be performed without causing the user U1 to feel strangeness.

The processing of the first control section 54A in the present embodiment is carried out as described above.

Incidentally, in the present embodiment, the second control section 54B also performs processing similar to the above-described processing. Hence, description of the processing of the second control section 54B will be omitted.

4. Summary

The virtual space connection device 100 according to the foregoing embodiment is used in a system that virtually connects the first space SA and the second space SB separated from the first space SA to each other by transmitting the first picked-up image signal obtained by image-pickup by the first imaging unit 1A in the first space SA to the second-space-SB side, projecting, by the second projector 31B, an image based on the first picked-up image signal received from the first-space-SA side onto the second projection target unit 32B having the second camera hole 33B for the second imaging unit 1B to pick up an image of the second space SB at the second-space-SB side, transmitting the second picked-up image signal obtained by image-pickup by the second imaging unit 1B in the second space SB to the first-space-SA side, and projecting, by the first projector 31A, an image based on the second picked-up image signal received from the second-space-SB side onto the first projection target unit 32A having the first camera hole 33A for the first imaging unit 1A to pick up an image of the first space SA at the first-space-SA side (see FIG. 1 and FIG. 3 or the like).

Thus, because, in each of the first space SA and the second space SB, an image of the other space is displayed and sound of the other space is output, the first space SA and the second space SB virtually are connected to each other.

Hence, by virtually connecting the spaces separated from each other, the user U1 and the user U2 present in respective places separated from each other, such as one room in an own house and an office as a workplace, can share the mutual spaces in a pseudo manner and communicate with each other.

The virtual space connection device 100 according to the embodiment includes a region setting section (the first region setting section 55A or the second region setting section 55B) that sets the specific output region AR including the first camera hole 33A in the first projection target unit 32A on the basis of a result of picking up an image of the first space SA by the first imaging unit 1A, a signal processing section (the first signal processing section 56A or the second signal processing section 56B) that generates post-processing image data by performing image signal processing on the first picked-up image signal in such a manner that the luminance value of the image projected onto the specific output region AR by the first projector 31A becomes the specific value set in advance, and a device control section (the first device control section 57A or the second device control section 57B) that makes the first projector 31A perform image projection based on the post-processing image data (see FIG. 4 and FIG. 7 or the like).

Thus, when image projection from the first projector 31A is performed onto the first projection target unit 32A, the projected light entering the first imaging unit 1A provided in the first camera hole 33A from the first projector 31A is reduced.

Hence, it is possible to suppress (reduce) the occurrence of lens flares LF in the picked-up image of the first space SA picked up by the first imaging unit 1A. The image of the first space SA which does not cause the user U2 to feel strangeness can therefore be displayed at the second-space-SB side.

In addition, the virtual space connection device 100 includes a region setting section (the first region setting section 55A or the second region setting section 55B) that sets the specific output region AR including the second camera hole 33B in the second projection target unit 32B on the basis of a result of picking up an image of the second space SB by the second imaging unit 1B, a signal processing section (the first signal processing section 56A or the second signal processing section 56B) that generates post-processing image data by performing image signal processing on the second picked-up image signal in such a manner that the luminance value of the image projected onto the specific output region AR by the second projector 31B becomes the specific value set in advance, and a device control section (the first device control section 57A or the second device control section 57B) that makes the second projector 31B perform image projection based on the post-processing image data (see FIG. 4 and FIG. 7 or the like).

Thus, similar to the first-space-SA side, the projected light entering the second imaging unit 1B at the second-space-SB side from the second projector 31B is also reduced, and the occurrence of lens flares LF in the picked-up image of the second space SB picked up by the second imaging unit 1B can be suppressed (reduced). Hence, the image of the second space SB which does not cause the user U1 to feel strangeness can similarly be displayed on the first-space-SA side.

Consequently, the first space SA and the second space SB separated from each other can virtually be connected to each other more naturally, and the users in the respective spaces can carry out more realistic smooth communication with each other.

Here, the specific value set in advance is such a value that the luminance value in the specific output region AR is equal to or less than a predetermined value. For example, a luminance value at a level at which the user U1 visually recognizing the first projection target unit 32A can recognize the specific output region AR to be black is set as the predetermined value, and the specific value is set to be equal to or less than the predetermined value.

Thus, such image projection that the specific output region AR is black is performed, and as a result, the occurrence of lens flares LF in the picked-up image can be suppressed (reduced).

In the virtual space connection device 100 according to the embodiment, the region setting section (the first region setting section 55A or the second region setting section 55B) sets the specific output region AR of the first projection target unit 32A on the basis of a comparison between a calculated value (flare metric value) based on the luminance of a picked-up image in the first picked-up image signal and a predetermined threshold value th (see S110 in FIG. 7 or the like).

Thus, the specific output region AR is set in consideration of the brightness of the whole of the first space SA.

Hence, the specific output region AR suitable for the conditions in the first space SA can be set, so that the occurrence of lens flares LF in the picked-up image of the first space SA can be suppressed (reduced) more effectively.

In addition, in the virtual space connection device 100, the region setting section (the first region setting section 55A or the second region setting section 55B) similarly sets the specific output region AR of the second projection target unit 32B on the basis of a comparison between a calculated value based on the luminance of a picked-up image in the second picked-up image signal and a predetermined threshold value th (see S110 in FIG. 7 or the like).

Thus, the specific output region AR is set with the brightness of the whole of the second space SB being taken into consideration, and the occurrence of lens flares LF in the picked-up image of the second space SB can similarly be suppressed (reduced).

The virtual space connection device 100 according to the embodiment includes a condition determining section (the first condition determining section 58A or the second condition determining section 58B) that determines the conditions within the first space SA on the basis of a result of analysis processing on the first picked-up image signal, and the region setting section (the first region setting section 55A or the second region setting section 55B) performs the setting processing for the specific output region AR according to the conditions within the first space SA, the conditions being determined by the condition determining section (the first condition determining section 58A or the second condition determining section 58B) (see FIG. 3 and FIG. 7 or the like).

Thus, the resetting processing of the specific output region AR is performed according to the conditions within the first space SA.

Hence, even when a displacement occurs between the position of the currently set specific output region AR and the actual position of the first camera hole 33A due, for example, to vibration of the device itself, an external factor such as an earthquake, and the like, subsequent occurrence of lens flares LF in the image picked up by the first imaging unit 1A can be suppressed (reduced) by performing the resetting processing of the specific output region AR as appropriate.

In addition, the virtual space connection device 100 includes a condition determining section (the first condition determining section 58A or the second condition determining section 58B) that determines conditions within the second space SB on the basis of a result of analysis processing on the second picked-up image signal, and the region setting section (the first region setting section 55A or the second region setting section 55B) performs the setting processing for the specific output region AR according to the conditions within the second space SB, the conditions being determined by the condition determining section (the first condition determining section 58A or the second condition determining section 58B) (see FIG. 3 and FIG. 7 or the like).

Thus, like the first space SA, the resetting processing for the specific output region AR is performed according to the conditions within the second space SB.

In the virtual space connection device 100 according to the embodiment, the condition determining section (the first condition determining section 58A or the second condition determining section 58B) determines whether or not there is a person within the first space SA on the basis of the result of analysis processing on the first picked-up image signal, and the region setting section (the first region setting section 55A or the second region setting section 55B) performs the setting processing for the specific output region AR when it is determined that there is no person within the first space SA. In addition, in the virtual space connection device 100, the condition determining section (the first condition determining section 58A or the second condition determining section 58B) determines whether or not there is a person within the second space SB on the basis of the result of analysis processing on the second picked-up image signal, and the region setting section (the first region setting section 55A or the second region setting section 55B) performs the setting processing for the specific output region AR when it is determined that there is no person within the second space SB (see FIG. 4 and FIG. 7 or the like).

Thus, the setting for the specific output region AR is completed before the user using the virtual space connection device 100 enters the inside of the space.

Because the processing illustrated in FIG. 7 is thus performed while the user is not in the space, it is possible to make display that does not cause a feeling of strangeness when the user within the space visually recognizes the virtually connected other space.

In the virtual space connection device 100 according to the embodiment, the first projector 31A performs image output based on the second picked-up image signal at the second-space-SB side, the second picked-up image signal being received from the first arithmetic processing unit 5A, from a side of the first projection target unit 32A to the first projection target unit 32A (see FIG. 2 and FIG. 3 or the like).

Thus, because the second space SB is displayed by using the first projection target unit 32A, a display region of the second space SB can be installed within the first space SA more easily than in the case of using a liquid crystal panel or the like.

In addition, because the first projector 31A projects a picked-up image from the side of the first projection target unit 32A, realism of a video can be prevented from being impaired when a shadow caused by falling of light from the first projector 31A onto the user U1 or the like is projected onto the first projection target unit 32A. In addition, a projection occupying an area from the floor to the ceiling is enabled by installing the first projector 31A on the side of the first projection target unit 32A. The same is true for the second-space-SB side.

5. Modifications

In the present embodiment, the description has been given of an example in which the user U1 present in the first space SA and the user U2 present in the second space SB communicate with each other (see FIG. 1 or the like). However, a user who intends to communicate with a user present in the other space does not necessarily needs to be present in the first space SA and the second space SB virtually connected to each other by the virtual space connection device 100. One space may simply be used so as to share a picked-up image and sound of the other space.

In the present embodiment, as an example, the first space SA and the second space SB have been described as indoor spaces. However, the first space SA and the second space SB are not limited to indoor spaces and may be outdoor spaces as long as the first space SA and the second space SB are environments in which the respective configurations of the virtual space connection device can be placed. That is, an indoor space and an outdoor space can virtually be connected to each other, or an outdoor space and an outdoor space can virtually be connected to each other.

In the present embodiment, the first arithmetic processing unit 5A and the second arithmetic processing unit 5B perform data communication by wireless communication via the network NW (see FIG. 1). However, the communication scheme is not limited to wireless communication, and the data communication may be performed by wired communication.

In the present embodiment, as an example, the first projection target unit 32A has been described as a screen (see FIGS. 1 to 3 or the like). However, it suffices for the first projection target unit 32A to be a region onto which the first projector 31A can project and output a video. The first projection target unit 32A may be an object, such as a wall surface of the first space SA or furniture. The same is true for the second projection target unit 32B on the second-space-SB side.

In the present embodiment, the one first imaging unit 1A is provided at substantially the central portion of the first projection target unit 32A (see FIG. 1 or the like). However, the first imaging unit 1A may include a plurality of imaging devices to recognize peripheral spatial coordinates. The same is true for the second imaging unit 1B on the second-space-SB side.

In the present embodiment, the description has been given of an example in which the first audio input unit 2A includes three microphones (see FIG. 1 or the like). However, the first audio input unit 2A may include two microphones or four or more microphones. When the number of microphones increases, a degree of spatial freedom increases, and sharp directivity can be obtained. The same is true for the second audio input unit 2B on the second-space-SB side.

In the present embodiment, the first audio input unit 2A performs, for example, directivity control on each microphone and processing such as noise reduction processing, filing processing, amplification processing, or sound quality processing according to a control signal corresponding to the conditions in the first space SA from the first arithmetic processing unit 5A (see FIG. 3 or the like). However, the noise reduction processing, the filing processing, the amplification processing, the sound quality processing, or the like may be performed by the first arithmetic processing unit 5A.

In this case, the first arithmetic processing unit 5A performs, on the first audio signal received from the first audio input unit 2A, processing, such as the noise reduction processing, the filing processing, the amplification processing, or the sound quality processing, according to the conditions in the first space SA. The same is true for the second-space-SB side.

In addition, in the present embodiment, the description has been given of an example in which the first image signal processing section 51A of the first arithmetic processing unit 5A performs, on the first picked-up image signal as an analog signal from the first imaging unit 1A, various kinds of signal processing, such as A/D conversion processing. However, the various kinds of signal processing may be performed by the first imaging unit 1A. Similarly, as for the second image signal processing section 51B of the second arithmetic processing unit 5B, the various kinds of signal processing may be performed by the second imaging unit 1B.

In the present embodiment, the description has been given of a case in which various kinds of processing are performed under the control of the first control section 54A of the first arithmetic processing unit 5A at the first-space-SA side, such as the processing of transmitting the second picked-up image signal obtained by image-pickup by the second imaging unit 1B in the second space SB to the first space SA, and projecting, by the first projector 31A, an image based on the second picked-up image signal received from the second-space-SB side onto the first projection target unit 32A having the first camera hole 33A for the first imaging unit 1A to pick up the image of the first space SA at the first-space-SA side; the processing of setting the specific output region AR including the first camera hole 33A in the first projection target unit 32A on the basis of the result of picking up the image of the first space SA by the first imaging unit 1A; the processing of generating post-processing image data by performing, on the second picked-up image signal, image signal processing in such a manner that the luminance value of the image projected onto the specific output region AR by the first projector 31A becomes the specific value set in advance; and the processing of making the first projector 31A perform image projection based on the post-processing image data. However, the above processing can also be performed under the control of the second control section MB of the second arithmetic processing unit 5B at the second-space-SB side.

In addition, each processing as described above can also be performed in a shared manner by the first control section MA of the first arithmetic processing unit 5A and by the second control section MB of the second arithmetic processing unit 5B.

In the present embodiment, the description has been given of an example in which the first control section MA makes the first projector 31A perform projection output in such a manner that the search region BX is white, and in a state in which projection is performed in such a manner that the search region BX is white, the first control section MA calculates the flare metric value WH of the picked-up image of the first space SA on the basis of the first picked-up image signal obtained by image-pickup by the first imaging unit 1A (S103 and S104 in FIG. 7). However, regarding the projection output in this case, it is adequate that high-luminance projection output is performed. For example, the projection output may be performed in such a manner that the search region BX is blue or green.

By using the projection output in blue or green in place of white as described above, it is possible to set the specific output region AR without a usage feeling of the user being impaired using the virtual space connection device 100.

Finally, advantageous effects described in the present disclosure are merely illustrative and are not limitative. Other advantageous effects may be achieved, or only some of the advantageous effects described in the present disclosure may be achieved.

In addition, the embodiment described in the present disclosure is merely illustrative, and the present invention is not limited to the foregoing embodiment. Hence, needless to say, various changes can be made according to design or the like in addition to the foregoing embodiment within the scope and spirit of the present invention. In addition, not combinations of all structural components described in the embodiment are necessarily essential to address the technical problems.

REFERENCE SIGNS LIST

1A: First imaging unit
1B: Second imaging unit
3A: First display unit
3B: Second display unit
5A: First arithmetic processing unit 5B: Second arithmetic processing unit
31A: First projector
31B: Second projector
32A: First projection target unit
32B: Second projection target unit
33A: First camera hole
33B: Second camera hole
55A: First region setting section
55B: Second region setting section
56A: First signal processing section
56B: Second signal processing section
57A: First device control section
57B: Second device control section
58A: First condition determining section
58B: Second condition determining section
100: Virtual space connection device
SA: First space
SB: Second space

What is claimed is:

1. A system that virtually connects a first space and a second space with each other by transmitting, to the second space separated from the first space, a first picked-up image signal obtained by picking up an image of the first space by a first imaging unit in the first space, receiving, from the second space, a second picked-up image signal obtained by picking up an image of the second space by a second imaging unit in the second space, and projecting, on a first projection target unit provided with a first camera hole for causing the first imaging unit to pick up the image of the first space in the first space, an image on the basis of the second picked-up image signal received from the second space by a first projector, the system comprising:

a region setting section that sets, as a search region, a region on which the image is projected by the first projector and which is surrounded by a plurality of end sides, the region including the first camera hole, and sets, as a specific output region, a region surrounded by the plurality of end sides after at least one of the plurality of end sides of the search region is moved toward the first camera hole;

a signal processing section that generates post-processing image data by performing image signal processing on the second picked-up image signal in such a way that a luminance value of the image projected onto the specific output region by the first projector becomes equal to or smaller than a specific value; and a device control section that causes the first projector to project the image on the basis of the post-processing image data, wherein the region setting section:

sets, as a first luminance region, a region surrounded by the moved end side after any end side among the plurality of end sides of the search region is moved toward the first camera hole, and an other end side;

sets, as a second luminance region, a region other than the first luminance region in the search region;

causes an image with a first luminance value to be projected on the first luminance region, causes an image with a second luminance value to be projected on the second luminance region, the second luminance value being higher than the first luminance value; and sets the specific output region on the basis of a plurality of image patterns projected on the first luminance region and the second luminance region in accordance with the movement of the any end side.

2. The system according to claim 1, wherein the region setting section sets the specific output region by performing, for at least the one of the plurality of the end sides of the search region, processing of setting, as the end side of the specific output region, the moved end side when an amount of incident light to the first imaging unit exceeds a predetermined amount of light upon movement of the any end side toward the first camera hole.

3. The system according to claim 1, wherein the region setting section executes:

processing of calculating a first flare metric value representing the amount of incident light to the first imaging unit on the basis of the first picked-up image signal obtained by the first imaging unit with the image that has the first luminance value being projected on the search region by the first projector, calculating a second flare metric value representing the amount of incident light to the first imaging unit on the basis of the first picked-up image signal obtained by the first imaging unit with the image that has the second luminance value being projected on the search region by the first projector, and calculating a determination threshold using the first flare metric value and the second flare metric value;

processing of calculating a third flare metric value representing the amount of incident light to the first imaging unit on the basis of the first picked-up image signal obtained by the first imaging unit with the image that comprises the first luminance region with the first luminance value and the second luminance region with the second luminance value being projected on the search region by the first projector; and processing of setting the specific output region including the first camera hole from the search region on the basis of a comparison between the third flare metric value and the determination threshold value.

4. The system according to claim 3, wherein the region setting section:

calculates, in accordance with a plurality of image patterns projected on the search region by the first projector, each of the plurality of image patterns having a different boundary position between the first luminance region and the second luminance region from each other, a plurality of the third flare metric values on the basis of the respective first picked-up image signals of the plurality of image patterns obtained by the first imaging unit; and sets the specific output region by comparing each of the plurality of calculated third flare metric values with the determination threshold.

5. The system according to claim 3, wherein the region setting section calculates the first flare metric value and the second flare metric value on the basis of luminance of each pixel of an imaging element of the first imaging unit in the first picked-up image signal.

6. The system according to claim 5, wherein the region setting section calculates the first flare metric value on the basis of a value obtained by performing weighting according to a distance from a center of the imaging element of the each pixel on the luminance detected from the each pixel.

7. The system according to claim 3, wherein:

when:

the first flare metric value is defined as BL;
the second flare metric value is defined as WH;
a coefficient by which the first flare metric value is multiplied is defined as a;

a coefficient by which the second flare metric value is multiplied is defined as b; and a+b=1, the a and the b are set so as to be a>b; and the region setting section obtains, as the determination threshold, a value calculated from a×BL+b×WH.

8. The system according to claim 1, further comprising a condition determining section that determines a condition within the first space on the basis of a result of analysis processing on the first picked-up image signal, wherein the region setting section sets the specific output region in accordance with the condition within the first space determined by the condition determining section.

* * * * *